F. M. CANNON.
LUBRICATOR.
APPLICATION FILED MAR. 1, 1909.
951,234.
Patented Mar. 8, 1910.
2 SHEETS—SHEET 1.
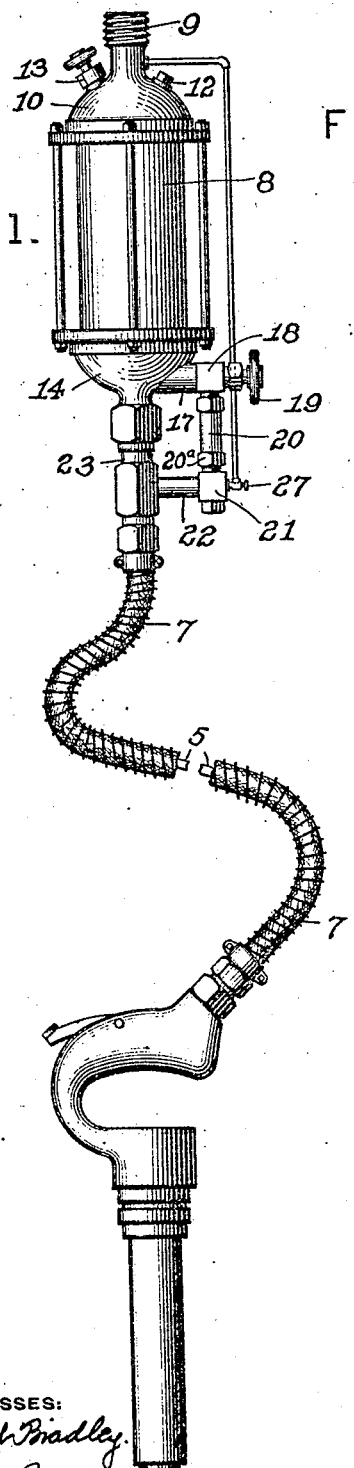
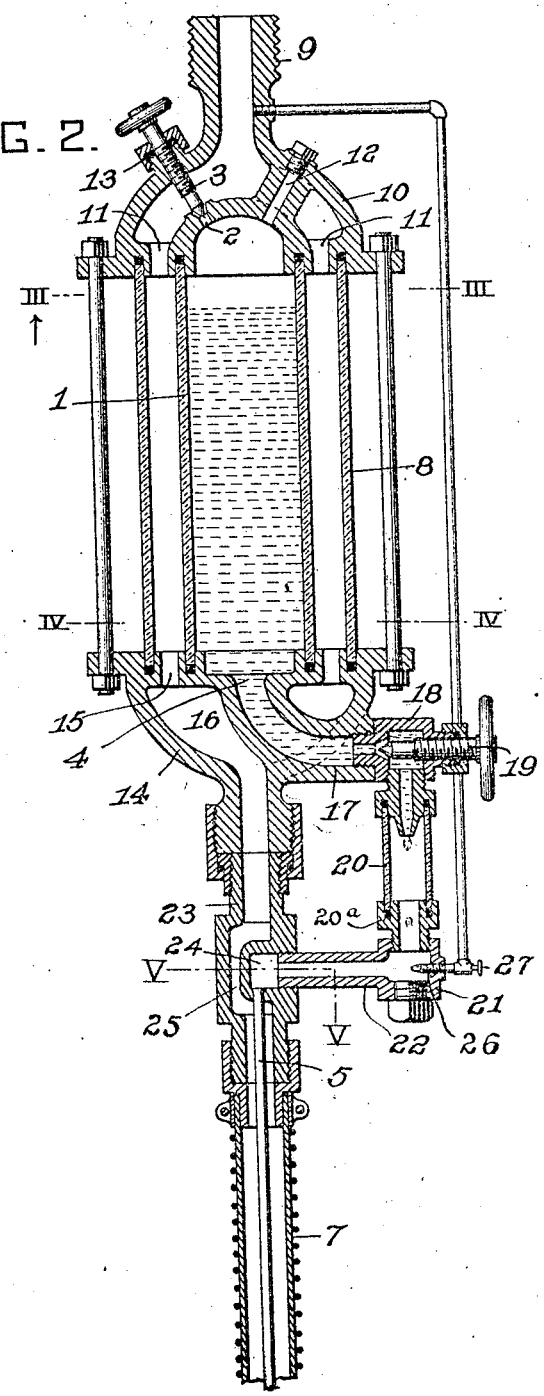
WITNESSES:
J. Herbert Bradley
Charles Barnett
INVENTOR
Francis M. Cannon
by Christy and Christy
Atty's

F. M. CANNON.
LUBRICATOR.
APPLICATION FILED MAR. 1, 1909.

951,234.

Patented Mar. 8, 1910.
2 SHEETS—SHEET 2.

WITNESSES:
J. Hebert Bradley.
Charles Barrett.

INVENTOR
Francis M. Cannon
by Christy and Christy
Atty's

UNITED STATES PATENT OFFICE.

FRANCIS M. CANNON, OF McKEESPORT, PENNSYLVANIA.

LUBRICATOR.

951,234.  Specification of Letters Patent.  Patented Mar. 8, 1910.

Application filed March 1, 1909. Serial No. 480,547.

*To all whom it may concern:*

Be it known that I, FRANCIS M. CANNON, residing at McKeesport, in the county of Allegheny and State of Pennsylvania, a citizen of the United States, have invented or discovered certain new and useful Improvements in Lubricators, of which improvement the following is a specification.

The invention described herein relates to certain improvements in mechanism for applying lubricating material to motors, especially where the same are separated a considerable distance from the pressure generator and are connected thereto by a flexible hose or pipe and to which a lubricant cannot be readily applied by devices now in use. Several means have been employed for lubricating such motors and other mechanisms, one by directly applying the lubricating cup or receptacle to the motor or other mechanism, but as such motor, especially when employed for riveting or punching, etc., is shifted in its position quite frequently, the lubricating material will not always feed to the parts to be lubricated. It has also been attempted to feed the lubricant through the hose or flexible connection between the pressure generator and motor, but the latter method is objectionable for the reason that the oil or other lubricating material is injurious and destructive to the hose.

The invention described herein has for its object a construction in which a tube independent of that employed for carrying the fluid pressure extends from a relatively stationary feed device for the lubricant to the motor.

The invention is hereinafter more fully described and claimed.

Figure 3:
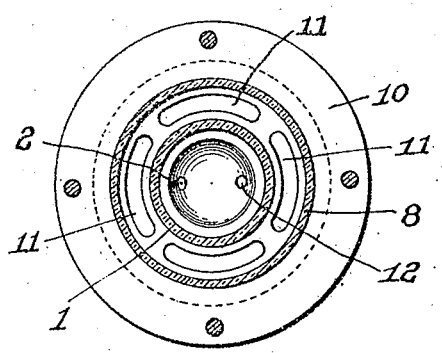
Figure 4:
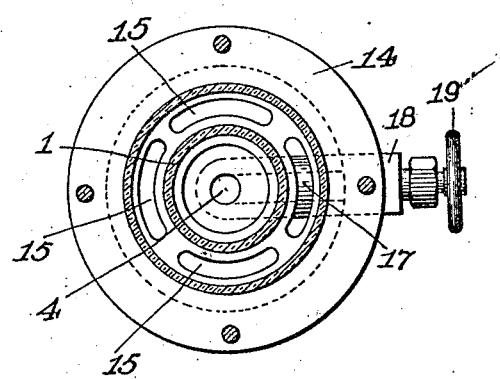
Figure 6:
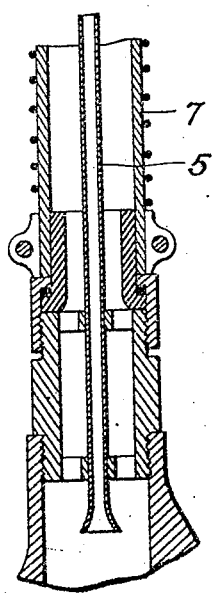
Figure 5:
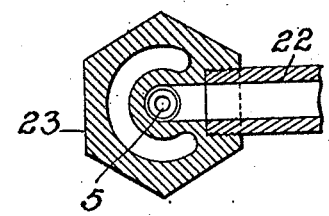
Figure 7:
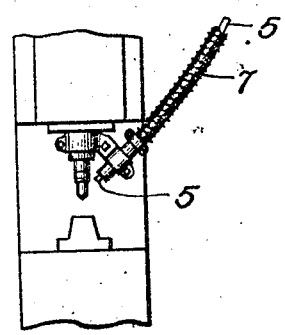

In the accompanying drawings forming a part of this specification Figure 1 is a view in elevation showing the lubricant reservoir and the flexible connection extending therefrom to the motor; Fig. 2 is a sectional elevation on an enlarged scale of the lubricating reservoir and the parts adjacent and connected thereto; Fig. 3 is a transverse section on a plane indicated by the line III—III Fig. 2, looking in the direction of the arrow; Figs. 4 and 5 are sectional views on planes indicated by the lines IV—IV and V—V Fig. 3; Fig. 6 is a sectional detail view showing the manner of connecting the fluid pressure hose and the lubricating tube to the motor; and Fig. 7 is a view showing a portion of a punching press and the manner of applying my improvement for lubricating the punch.

In the practice of my invention the lubricating material is placed within a suitable receptacle 1 having a port 2 controlled by a suitable valve 3, whereby fluid pressure may be admitted into the receptacle to force the oil to the motor. This receptacle has a discharge port 4 connected in any suitable manner to a tube 5, formed of some flexible material which will not be injuriously acted on by the lubricating material. This tube 5 extends to a motor as for example the motor of a pneumatic hammer, or to other mechanism as shown in Fig. 6, the tube being connected by preference to the port through which fluid pressure is admitted to the motor, or in such position that the lubricant will be discharged against the desired part. While not necessary it is preferred for purposes of protection that the tube 5 should pass through the tube 7 whereby fluid pressure is conducted to the motor, or other mechanism for operating or cooling purposes, so that the tube 7 will protect the tube 5 from injury and prevent any sharp kinks or bends in the same which would prevent a flow of the lubricating material.

While my improvement may in its simplest form, consist of the parts described it is preferred that the receptacle 1 should be inclosed in a second receptacle of sufficiently larger diameter than receptacle 1 to permit a free flow of fluid under pressure through the space between the two receptacles. The outer receptacle 8 is adapted to be connected by a nipple 9 or other suitable means to the fluid pressure generator, and at its lower end to be connected to the flexible tube 7.

In my preferred construction the bodies of the receptacles 1 and 8 are formed of glass cylinders, the upper ends of which fit in suitable grooves in a casting 10 forming the head of the joint receptacle and through this casting are formed ports or openings 11 for the flow of fluid under pressure. A passage 12 is formed through this head in a solid portion thereof for feeding the lubricating material to receptacle 1 and the stem of valve 3, passes through a stuffing box 13 in the outer wall of the head so as to permit of the regulation of the valve from the exterior of the receptacle. The lower ends of the cylinders 1 and 8 are seated in grooves in the head 14 and between these seats are formed passages 15 for the flow of fluid pressure into the chamber 16 formed in the head. The outlet from the reservoir 1 is formed by a tube 17 preferably integral with the head and extending out through the side wall of the latter. On the outer end of this tubular projection is secured a head 18 having therein a valve 19 for the control of the lubricating material flowing from the reservoir. This head is also provided with a nipple through which the oil will flow into a chamber formed of a glass tube 20 having one end seated in suitable grooves in the nipple 17, and its opposite end in corresponding grooves in a coupling member 20ª extending from the head 21, which is provided with a branch 22 extending into a block 23 having a chamber 24 communicating with the branch 22, and also having a passage 25 for the flow of fluid under pressure from chamber 16. One end of this block is secured to the lower head of the reservoir and its opposite end adapted to be secured to the hose 7. The oil-feeding pipe 5 has one end connected to the chamber 24, and its opposite end to the motor as heretofore stated. The reservoir 1 having been charged with lubricating material through the port 12, the valve 3 is slightly opened to permit a feeding pressure to enter the reservoir and force the oil out through the tube 17, past the valve 19 and down through the glass tube 20, whence it will flow by the branch 22 into the chamber 24 and along the tube 5 to the motor or other mechanism. The rate of feed of the lubricating material can be regulated not only by the valve 3 but also by the valve 19. In order to insure a feeding of the lubricating material to the motor without maintaining the pipe 5 full of lubricating material, a nipple 26 is inserted in the head 21 in line with the branch 22, said nipple having a valve connection 27 with the fluid pressure pipe preferably adjacent to the nipple 9 where a connection is made with the pressure generator so that the blast of air entering through this nipple 26 will be at a high state of efficiency. By the use of this blast of air the lubricating material may be fed in drops or in larger quantities if desired to the motor or other mechanism, and whatever air passes along the lubricating tube will be utilized in operating the motor as the connection of the lubricating tube to the motor is through the inlet port of the latter or in cooling the part against which the fluid is directed. By causing the oil to pass through a transparent tube the operator can readily determine whether or not lubricating material is being properly fed to the motor. As will be readily understood by those skilled in the art, the lubricating tube being of much smaller size than the air-transporting tube, it will not be subjected to such sharp bends as will prevent a flow of oil.

In Fig. 7 my improvement is shown applied to a metal working tool, i. e., a punch, for applying a lubricant thereto, and also a cooling medium.

I claim herein as my invention:

1. In a lubricator for portable motors or other mechanism, the combination of a mechanism to be lubricated, a flexible tube forming a part of the connection of the mechanism with a fluid pressure generator, a reservoir for the lubricating material having a valved connection with the fluid pressure supply, and a flexible tube extending from the reservoir through the fluid pressure pipe to the mechanism.

2. In a lubricator for portable motors or other mechanism, the combination of a mechanism to be lubricated, a connection adapted to conduct fluid under pressure to the mechanism and having a flexible portion, a reservoir for lubricating material in such connection, a flexible tube extending from the reservoir through the flexible connection to the mechanism, and a valve controlling the admission of fluid pressure to the reservoir.

3. In a lubricator for portable motors, the combination of a motor or other mechanism, a flexible connection adapted to conduct a fluid under pressure to the mechanism to be lubricated, a reservoir for the lubricating material, a flexible tube connecting the reservoir with the mechanism, and means intermediate of the reservoir and the mechanism for subjecting the lubricating material to fluid under pressure.

4. In a lubricator for portable motors or other mechanism, the combination of a case or shell adapted to be connected to a fluid pressure generator, a flexible connection from the case or shell adapted to conduct fluid under pressure to a motor or other mechanism, a case or shell arranged within the first case or shell and adapted to serve as a reservoir for lubricating material and a flexible tube adapted to connect such reservoir with the motor or other mechanism.

5. In a lubricator for portable motors or other mechanism, the combination of a case or shell adapted to be connected through a fluid pressure generator, a connection having a flexible portion and adapted to conduct fluid under pressure from the case or shell to a motor or other mechanism, a case or shell arranged within the first case or shell, a connection from the inner case or shell to the motor or other mechanism, a portion of such connection between the inner case or shell of the motor or other mechanism being formed of transparent material.

6. In a lubricator for portable motors or other mechanism, the combination of a case or shell adapted to be connected to a fluid pressure generator, a flexible connection adapted to conduct a fluid under pressure from the case or shell to a motor or other mechanism, a case or shell arranged within the first case or shell and adapted to serve as a reservoir for lubricating material, a port for admitting fluid pressure to the reservoir, a flexible connection adapted to conduct lubricating material from the reservoir to the motor or other mechanism, a valve controlling the flow from the reservoir, and means intermediate of the valve and motor or other mechanism for subjecting the lubricating material to fluid pressure.

In testimony whereof, I have hereunto set my hand.

FRANCIS M. CANNON.

Witnesses:
PETER LANGSDORF,
CHARLES A. CONN.